United States Patent
Kifuku et al.

(10) Patent No.: US 8,983,727 B2
(45) Date of Patent: Mar. 17, 2015

(54) STEERING CONTROL APPARATUS

(75) Inventors: Takayuki Kifuku, Chiyoda-ku (JP);
Hiroyuki Kozuki, Chiyoda-ku (JP);
Masaki Matsushita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1355 days.

(21) Appl. No.: 12/160,948

(22) PCT Filed: May 30, 2006

(86) PCT No.: PCT/JP2006/310740
§ 371 (c)(1),
(2), (4) Date: Jul. 15, 2008

(87) PCT Pub. No.: WO2007/138676
PCT Pub. Date: Dec. 6, 2007

(65) Prior Publication Data
US 2010/0222968 A1 Sep. 2, 2010

(51) Int. Cl.
*B62D 5/04* (2006.01)
*B62D 6/00* (2006.01)
*B62D 15/02* (2006.01)
*H02P 29/02* (2006.01)

(52) U.S. Cl.
CPC ............. *B62D 5/0493* (2013.01); *H02P 29/02* (2013.01)
USPC ............................................ 701/42; 318/437

(58) Field of Classification Search
CPC ... B62D 5/0463; B62D 5/0484; B62D 5/0487
USPC ........................................... 318/437; 701/42
See application file for complete search history.

(56) References Cited

U.S. PATENT DOCUMENTS

| | | | |
|---|---|---|---|
| 6,041,884 A | 3/2000 | Shimizu et al. | |
| 7,002,313 B2* | 2/2006 | Kawada | 318/564 |
| 2003/0222612 A1* | 12/2003 | Matsushita | 318/437 |
| 2005/0231145 A1* | 10/2005 | Mukai et al. | 318/432 |
| 2006/0076182 A1 | 4/2006 | Kifuku et al. | |
| 2007/0192004 A1* | 8/2007 | Fukuda | 701/41 |

FOREIGN PATENT DOCUMENTS

| | | |
|---|---|---|
| DE | 19841710 A1 | 4/1999 |
| EP | 0554703 A1 | 8/1993 |
| JP | 06-219310 A | 8/1994 |

(Continued)

*Primary Examiner* — John Q Nguyen
*Assistant Examiner* — Rodney P King
(74) *Attorney, Agent, or Firm* — Sughrue Mion, PLLC; Richard C. Turner (57) ABSTRACT

A steering control apparatus is obtained which can achieve a sophisticated control function and redundancy of a motor output torque control unit with a simple construction. The apparatus includes a motor 3 that provides assist torque to a steering system, and a processing unit 2 that has an input processing section 21 for taking in detection signals of various kinds of sensors, and an inverter 25a for driving the motor 3, wherein a command is given to the inverter 25a based on the detection signals. The processing unit 2 has a motor target output torque calculation section 221a, a motor output torque control unit 222, a plurality of main-calculation sections, and a plurality of sub-calculation sections corresponding to the main-calculation sections, and determines abnormality of the motor output torque control unit 222 based on individual calculation results of the main-calculation sections and the sub-calculation sections.

20 Claims, 3 Drawing Sheets

(56) References Cited

FOREIGN PATENT DOCUMENTS

| JP | 07-047963 A | 2/1995 |
| JP | 07-143604 A | 6/1995 |
| JP | 2861680 B2 | 12/1998 |
| JP | 11-078943 A | 3/1999 |
| JP | 2915234 B2 | 4/1999 |
| JP | 2000-074694 A | 3/2000 |
| JP | 2003-170850 A | 6/2003 |

* cited by examiner

| SIN | COS | MAGNITUDE RELATION | REGION |
|---|---|---|---|
| MAIN | MAIN | \|COS\|≧\|SIN\| | R1 |
| | | \|COS\|<\|SIN\| | R2 |
| MAIN | SUB | \|COS\|<\|SIN\| | R3 |
| | | \|COS\|≧\|SIN\| | R4 |
| SUB | SUB | \|COS\|≧\|SIN\| | R5 |
| | | \|COS\|<\|SIN\| | R6 |
| SUB | MAIN | \|COS\|<\|SIN\| | R7 |
| | | \|COS\|≧\|SIN\| | R8 |

STEERING CONTROL APPARATUS

TECHNICAL FIELD

The present invention relates to an electric steering control apparatus that controls a motor for providing assist torque to a steering system of a motor vehicle or the like. More particularly, it relates to novel technical improvements in determining whether a motor output torque control unit is abnormal.

BACKGROUND ART

In the past, a electric steering control apparatus includes a main CPU and a sub CPU that are connected to each other by a data bus, a motor drive circuit that drives a motor in accordance with a drive signal from the main CPU, and a logic circuit that is inserted between the main CPU and the motor drive circuit, wherein the driving direction of the motor is limited by driving the logic circuit to control the passage of a driving direction signal from the main CPU by means of an output signal from the sub CPU (see, for example, a first patent document).

Now, reference will be made to the operation of the conventional apparatus as described in the above-mentioned first patent document.

The main CPU calculates the driving direction of the motor, etc., based on detection signals from various kinds of sensors such as a torque sensor, and sends the calculation result of the motor driving direction to the sub CPU through the data bus.

The sub CPU compares a steering torque signal from the torque sensor and the motor driving direction input from the main CPU with each other, determines, when both of them do not coincide with each other, that the main CPU is in failure (an abnormality occurrence state), and generates an output signal to inhibit the driving of the motor.

[First Patent Document] Japanese patent No. 2915234

DISCLOSURE OF THE INVENTION

Problems to be Solved by the Invention

The conventional steering control apparatus as constructed above has a problem that it is difficult for the apparatus to be applied to motor driving control in which the driving direction and the steering torque do not coincide with each other, such as, for example, external disturbance compensation control based on the angular velocity or the angular acceleration of the motor.

In addition, there has been a problem that it is also difficult for the apparatus to be applied to a three-phase motor in which the driving direction of the motor is not directly output from the main CPU to the motor drive circuit.

The present invention is intended to obviate the problems as referred to above, and has for its object to obtain a steering control apparatus which can achieve a sophisticated control function and the redundancy of a motor output torque control unit with a simple construction.

Means for Solving the Problems

A steering control apparatus according to the present invention includes a motor for providing assist torque to a steering system which is operated by a driver, a variety of kinds of sensors that detects at least a steering state of the steering system, and a processing unit that has an input processing section for taking in sensor detection signals from the variety of kinds of sensors and an output processing section for driving the motor, and provides an instruction command to the output processing section based on the sensor detection signals. The processing unit includes a motor target output torque calculation section that calculates a target output torque of the motor, and a motor output torque control unit that calculates an impression voltage to the motor by controlling a motor current flowing in the motor in a feedback manner so as to make an actual output torque of the motor coincide with the target output torque. The motor output torque control unit includes at least a plurality of main-calculation sections, and a plurality of sub-calculation sections corresponding to the main-calculation sections. Abnormality of the motor output torque control unit is determined based on individual calculation results of the plurality of main-calculation sections and the plurality of sub-calculation sections.

EFFECTS OF THE INVENTION

According to the present invention, the redundancy of the motor output torque control unit can be achieved with a simple construction.

BEST MODE FOR CARRYING OUT THE INVENTION (Embodiment 1)

Hereinafter, a first embodiment of the present invention will be described while referring to the accompanying drawings.

Figure 1:
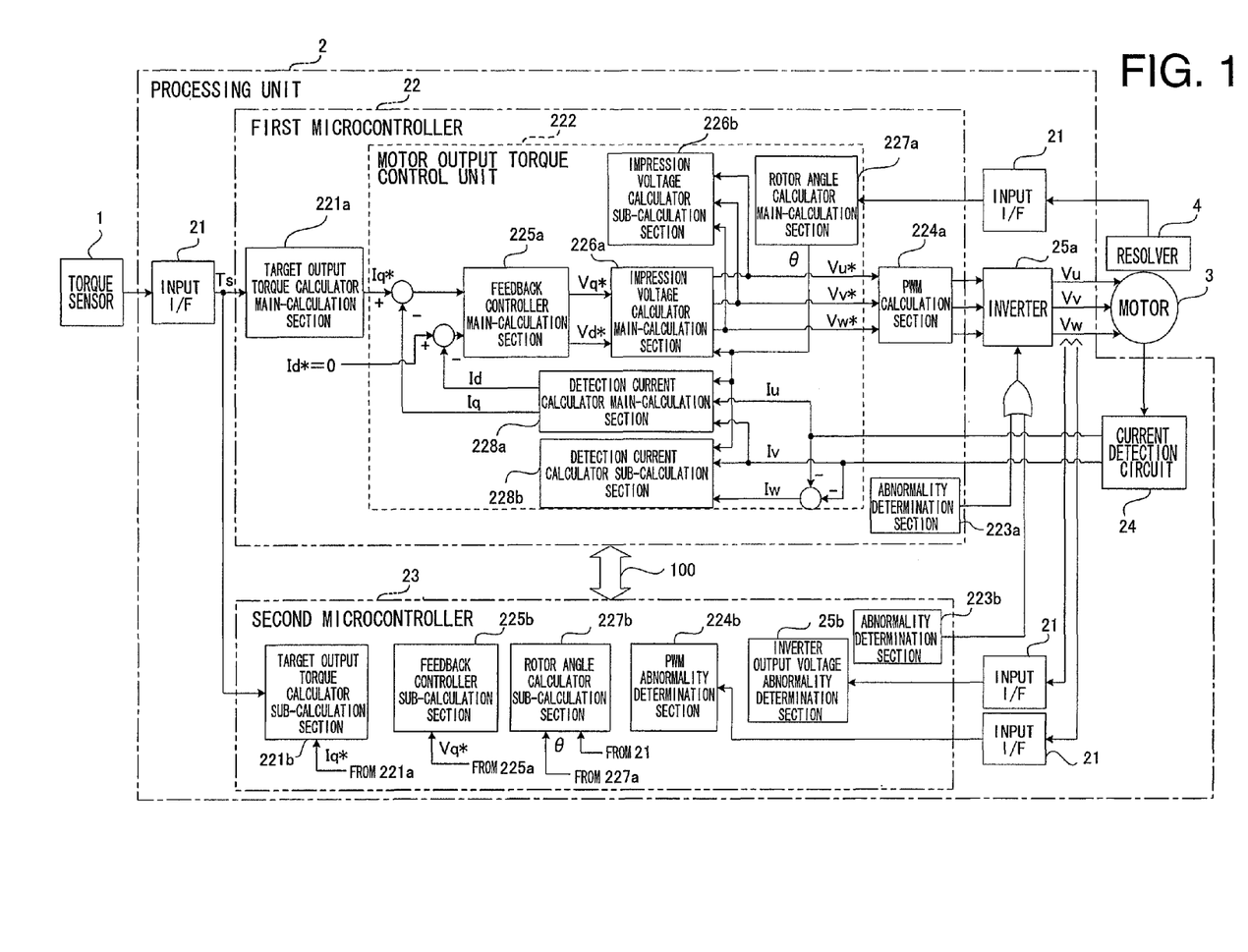
FIG. 1 is a block diagram showing a steering control apparatus according to a first embodiment of the present invention (first embodiment).

FIG. 1 is a block diagram showing a steering control apparatus according to the first embodiment of the present invention.

In FIG. 1, the steering control apparatus comprises a torque sensor 1, a processing unit 2, a motor 3 and a resolver 4.

The torque sensor 1 detects the steering state (steering torque Ts of a driver) of a steering system of a vehicle, and inputs it to the processing unit 2.

The motor 3 is, for example, a synchronous motor of a permanent magnet field, and it is connected with the steering system that is operated by the driver, and is driven by a control signal based on the result of calculation of the processing unit 2 to provide assist torque to the steering system, thereby assisting a steering force of the driver.

The resolver 4 installed to the motor 3 functions as an angle sensor, and it detects rotor angular position information on the motor 3, and inputs a detection signal related to a rotor angle to the processing unit 2.

The processing unit 2 constitutes an essential portion of the steering control apparatus, and includes an input interface circuit (input processing section) 21 for taking in sensor detection signals from various kinds of sensors, a first microcontroller (first processing unit) 22 having a main CPU, a second microcontroller (second processing unit) 23 having a sub CPU, a current detection circuit 24 for detecting a phase current of the motor 3, and an inverter 25a (output processing section) for driving the motor 3, wherein a command is given to the inverter (the output processing section) 25a based on the sensor detection signals.

The first microcontroller 22 comprises a target output torque calculator main-calculation section 221a, a motor output torque control unit 222, an abnormality determination section 223a, and a PWM calculation section 224a.

The target output torque calculator main-calculation section 221a calculates a q-axis target current value Iq* corresponding to a target output torque of the motor 3 based on a detection signal (steering torque Ts) from the torque sensor 1.

By controlling a motor current in a feedback manner, the motor output torque control unit 222 controls the PWM calculation section 224a so as to make the q-axis target current value Iq* (the target output torque of the motor 3), which is calculated by the target output torque calculator main-calculation section 221a, and a q-axis detection current Iq (an actual output torque of the motor 3), which is calculated based on a detection signal (actual phase currents Iu, Iv) from the current detection circuit 24, coincide with each other.

The abnormality determination section 223a determines, based on all the calculation results, whether the first microcontroller 22 or the second microcontroller 23 is abnormal, and generates a command to stop the inverter 25a to interrupt the supply of current to the motor 3 at an abnormal time.

The PWM calculation section 224a pulse width modulates a motor phase voltage signal (three-phase target impression voltage values Vu*, Vv* and Vw*) from the motor output torque control unit 222, and supplies to the inverter 25a a PWM signal that is generated from the three-phase target impression voltage values Vu*, Vv*, Vw*.

The inverter 25a is driven by the PWM signal from the PWM calculation section 224a to drive the motor 3.

The motor output torque control unit 222 comprises a feedback controller main-calculation section 225a, an impression voltage calculator main-calculation section 226a, a impression voltage calculator sub-calculation section 226b, a rotor angle calculator main-calculation section 227a, a detection current calculator main-calculation section 228a, and a detected current calculator sub-calculation section 228b.

The feedback controller main-calculation section 225a controls the motor current in a feedback manner based on the q-axis detection current Iq calculated from the detected values (the actual phase currents Iu, Iv) of the current detection circuit 24.

The impression voltage calculator main-calculation section 226a converts a q-axis impression voltage value Vq* and a d-axis impression voltage value Vd* calculated by the feedback controller main-calculation section 225a into phase voltages of the motor 3 (three-phase target impression voltage values Vu*, Vv*, Vw*).

The impression voltage calculator sub-calculation section 226b determines abnormality of the impression voltage calculator main-calculation section 226a based on the three-phase target impression voltage values Vu*, Vv*, Vw*.

The rotor angle calculator main-calculation section 227a calculates a rotor angle (electrical angle) θ of the motor 3 based on an output signal of the resolver 4.

The detection current calculator main-calculation section 228a converts a d-axis detection current Id and the q-axis detection current Iq based on the calculated rotor angle θ and the actual phase currents Iu, Iv of the motor 3 detected by the current detection circuit 24.

The detection current calculator sub-calculation section 228b determines abnormality of the detection current calculator main-calculation section 228a based on the calculated rotor angle θ and actual phase currents Iv, Iw of the motor 3.

On the other hand, the second microcontroller 23 is mutually connected to the first microcontroller 22 through a communication line 100, and includes a target output torque calculator sub-calculation section 221b, a feedback controller sub-calculation section 225b, a rotor angle calculator sub-calculation section 227b, a PWM abnormality determination section 224b, an inverter output voltage abnormality determination section 25b, and an abnormality determination section 223b.

The target output torque calculator sub-calculation section 221b determines abnormality of the target output torque calculator main-calculation section 221a in the first microcontroller 22 based on the steering torque Ts detected by the torque sensor 1 and the q-axis target current value Iq* calculated by the target output torque calculator main-calculation section 221a.

The feedback controller sub-calculation section 225b determines abnormality of the feedback controller main-calculation section 225a based on the d-axis impression voltage value Vd* and the q-axis impression voltage value Vq* calculated by the feedback controller main-calculation section 225a in the motor output torque control unit 222.

The rotor angle calculator sub-calculation section 227b determines abnormality of the rotor angle calculator main-calculation section 227a based on input information (angular position detection signals sin θ, cos θ) to the rotor angle calculator main-calculation section 227a in the motor output torque control unit 222 and the rotor angle θ calculated by the rotor angle calculator main-calculation section 227a.

The PWM abnormality determination section 224b determines abnormality of the PWM calculation section 224a in the first microcontroller 22 by supervising the period of a carrier wave by monitoring an impression voltage to the motor 3.

The inverter output voltage abnormality determination section 25b determines abnormality of the inverter 25a by supervising a neutral point potential by monitoring the three-phase impression voltages Vu, Vv, Vw to the motor 3.

The abnormality determination section 223b determines, similar to the abnormality determination section 223a in the first microcontroller 22, the presence or absence of abnormality of the main-calculation sections from the calculation results of all the main-calculation sections and sub-calculation sections, and interrupts the driving of the motor 3 by the inverter 25a when abnormality is found even in either one of them.

As shown in FIG. 1, the processing unit 2 includes, as the plurality of main-calculation sections, the target output torque calculator main-calculation section 221a, the feedback controller main-calculation section 225a, the impression voltage calculator main-calculation section 226a, the rotor angle calculator main-calculation section 227a, and the detection current calculator main-calculation section 228a.

In addition, the processing unit 2 also includes, as the plurality of sub-calculation sections corresponding to the main-calculation sections, the target output torque calculator sub-calculation section 221b, the feedback controller sub-calculation section 225b, the impression voltage calculator sub-calculation section 226b, the rotor angle calculator sub-calculation section 227b, and the detected current calculator sub-calculation section 228b.

That is, the processing unit 2 includes a target output torque calculation section (the target output torque calculator main-calculation section 221a and the target output torque calculator sub-calculation section 221b), a feedback control section (the feedback controller main-calculation section 225a and the feedback controller sub-calculation section 225b), an impression voltage calculation section (the impression voltage calculator main-calculation section 226a and the impression voltage calculator sub-calculation section 226b), a rotor angle calculation section (the rotor angle calculator main-calculation section 227a and the rotor angle calculator sub-calculation section 227b), and a detection current calculation section (the detection current calculator main-calculation section 228a and the detection current calculator sub-calculation section 228b), all of which constitute redundant calculation sections, respectively.

In addition, in the processing unit 2, the motor output torque control unit 222 at least has the impression voltage calculator main-calculation section 226a and the detection current calculator main-calculation section 228a, which are main-calculation sections, and the impression voltage calculator sub-calculation section 226b and the detection current calculator sub-calculation section 228b, which are sub-calculation section, and determines abnormality of the motor output torque control unit 222 based on the individual calculation results of the main-calculation sections and the sub-calculation sections.

In addition, here, by way of example, the impression voltage calculator sub-calculation section 226b and the detection current calculator sub-calculation section 228b, which execute sub calculations being equivalent in processing contents to the main calculations and having a relatively large amount of calculations, are mounted in the first microcontroller 22 including the main CPU having a fast processing speed, and the other sub-calculation sections, which execute simplified sub calculations, are mounted in the second microcontroller 23 including the sub CPU having a processing speed slower than that of the main CPU.

Moreover, the motor 3 is not limited to the synchronous motor of the permanent magnet field, but may be motors other than an induction motor and a vector control motor.

In case where the motor 3 is a polyphase (e.g., three-phase) motor, as shown in the drawings, the impression voltage calculator main-calculation section 226a in the motor output torque control unit 222 calculates impression voltages to the individual phases of the polyphase motor, and the impression voltage calculator sub-calculation section 226b determines abnormality of the impression voltage calculator main-calculation section 226a.

Further, regardless of the kind of the motor 3, the rotor angle calculator main-calculation section 227a in the motor output torque control unit 222 calculates the rotor angle θ of the motor, and the rotor angle calculator sub-calculation section 227b in the second microcontroller 23 determines abnormality of the rotor angle calculator main-calculation section 227a.

Specifically, the resolver 4, functioning as the angle sensor, outputs angular position detection signals including information of sin θ and cos θ on the rotor angle θ of the motor 3, and the rotor angle calculator main-calculation section 227a obtains the rotor angle θ from arctan (sin θ/cos θ) based on the angular position detection signals.

On the other hand, the rotor angle calculator sub-calculation section 227b obtains a separate rotor angle θ with a resolution of 45 degrees from eight sets of combinations of the polarity signs and the amplitude magnitude comparison relation of sin θ and cos θ, and determines abnormaility of the rotor angle calculator main-calculation section 227a by comparing the calculation results (rotor angle θ) of the main-calculation sections with the calculation results (rotor angle θ') of the sub-calculation sections.

In addition, in case where a three-phase motor is used as the motor 3, the detection current calculator main-calculation section 228a related to of in the motor output torque control unit 222 converts current detection values of at least two phases (actual phase currents Iu, Iv) of the motor 3 (three-phase motor) into two-axis direct currents (d-axis detection current Id and q-axis detection current Iq).

On the other hand, the detection current calculator sub-calculation section 228b in the motor output torque control unit 222 calculates two-axis direct currents without using, at least for one phase, a phase current (the actual phase current Iu in FIG. 1) that is used by the detection current calculator main-calculation section 228a.

That is, the detection current calculator sub-calculation section 228b converts the current detection values of at least two phases among individual phase currents of the motor 3 (three-phase motor) into two-axis direct currents, but at least one of the two phases used at this time includes a phase that is not used by the current main-calculation sections.

Also, in the motor output torque control unit 222, the feedback controller main-calculation section 225a performs feedback control by converting the two-axis direct currents (Id, Iq) converted from the individual phase currents (Iu, Iv) of the motor 3 (three-phase motor) into two-axis direct current voltages (Vq*, Vd*), and the impression voltage calculator main-calculation section 226a related to the dq axes control converts the two-axis direct current voltages (Vq*, Vd*) into impression voltages (the three-phase target impression voltage values Vu*, Vv*, Vw*) to the individual phases of the motor 3 (three-phase motor).

Moreover, the impression voltage calculator sub-calculation section 226b in the motor output torque control unit 222 calculates an actual neutral point potential based on the three-phase target impression voltage values Vu*, Vv*, Vw* corresponding to the impression voltages impressed from the impression voltage calculator main-calculation section 226a to the motor 3 (three-phase motor), and determines, depending upon whether the neutral point potential is appropriate, whether the impression voltage calculator main-calculation section 226a is right or wrong.

Here, as will be described later, it is assumed that the individual sub-calculation sections check the main-calculation sections according to expressions or formulae different from those of the individual main-calculation sections.

Further, the first and second microcontrollers 22, 23 are connected to each other for mutual communications through the communication line 100, and various data for determining the abnormalities of the individual main-calculation sections 221a, 225a, 227a in the first microcontroller 22 are input to the individual sub-calculation sections 221b, 225b, 227b in the second microcontroller 23 through the communication line 100.

In addition, the abnormality determination sections 223a, 223b in the first and second microcontrollers 22, 23 each include an energization and deenergization control section that controls the supply and interruption of current to the motor 3, and are constructed, as a fail-safe processing function of each energization and deenergization control section, such that when it is determined that at least one of the plurality of main-calculation sections 221a, 225a, 226a, 227a, 228a is abnormal, or when at least one of the inverter output voltage abnormality determination section 25b and the PWM abnormality determination section 224b makes an abnormality determination, the supply of current from the inverter 25a to the motor 3 is interrupted for the protection of the entire apparatus including the motor 3 and the steering system.

Further, at least one of the first and second microcontrollers 23 is provided with an energization and deenergization function check section that checks a function of energizing and deenergizing the motor 3 in association with the abnormality determination sections 223a, 223b.

The energization and deenergization function check section is constructed such that it checks, as a check function upon activation, at least once whether the function of energizing and deenergizing the motor 3 operates normally, by means of the abnormality determination sections 223a, 223b before the driving control of the motor 3 after activation of the steering control apparatus is started, and when it is determined that the energization and deenergization function is abnormal, the driving control of the motor 3 is inhibited so as not to perform a steering control operation similarly for the protection of the entire apparatus including the motor 3 and the steering system.

Here, note that in FIG. 1, as a hardware construction, part of the sub-calculation sections among the plurality of main-calculation sections and sub-calculation sections are incorporated in the second microcontroller 23 different from the first microcontroller 22, but all of the plurality of main-calculation sections and sub-calculation sections may be incorporated in one and the same microcontroller.

In addition, it is not limited to the specific construction example of FIG. 1, but an arbitrary part of the plurality of main-calculation sections and sub-calculation sections may be separately incorporated in the second microcontroller 23 different from the first microcontroller 22.

Next, reference will be made to the processing operation of the steering control apparatus including a redundant system according to the first embodiment of the present invention.

First of all, in the first microcontroller 22, the target output torque calculator main-calculation section 221a calculates the q-axis target current value Iq* for driving the motor 3 by performing predetermined calculation processing based on the steering torque Ts detected by the torque sensor 1.

The q-axis target current Iq* calculated by the target output torque calculator main-calculation section 221a is input to the feedback controller main-calculation section 225a, and at the same time to the target output torque calculator sub-calculation section 221b mounted in the second microcontroller 23 through the communication line 100.

On the other hand, the rotor angle calculator main-calculation section 227a in the motor output torque control unit 222 calculates the rotor angle (electrical angle) θ based on the angular position detection signals sin θ, cos θ from the resolver 4 according to the calculation of arctan (sin θ/cos θ).

The rotor angle θ calculated by the rotor angle calculator main-calculation section 227a is supplied to the impression voltage calculator main-calculation section 226a, the detection current calculator main-calculation section 226a and the detection current calculator sub-calculation section 228b, and at the same time to the rotor angle calculator sub-calculation section 227b mounted in the second microcontroller 23 through the communication line 100. Also, the angular position detection signals sin θ, cos θ used for the calculation of the electrical angle θ are supplied to the rotor angle calculator sub-calculation section 227b through the communication line 100.

The detection current calculator main-calculation section 228a calculates the d-axis detection current Id and the q-axis detection current Iq based on the phase current values Iu, Iv detected by the current detection circuit 24 and the rotor angle θ calculated by the rotor angle calculator main-calculation section 227a by performing three-phase/two-phase conversion (dq conversion) by the use of the following expression (1).

$$\begin{bmatrix} I_d \\ I_q \end{bmatrix} = \sqrt{2} \begin{bmatrix} -\sin\left(\theta + \frac{4\pi}{3}\right) & \sin\theta \\ -\sin\left(\theta + \frac{11\pi}{6}\right) & \sin\left(\theta + \frac{\pi}{2}\right) \end{bmatrix} \cdot \begin{bmatrix} I_u \\ I_v \end{bmatrix} \quad (1)$$

Deviations of the d-axis detection current Id and the q-axis detection current Iq after conversion calculated according to expression (1) above from two-axis target current values Id*, Iq*, respectively, are individually calculated, and are then input to the feedback controller main-calculation section 225a.

The feedback controller main-calculation section 225a generates two-axis target impression voltage values Vd*, Vq* by performing PI control based on the deviations between the two-axis target current values Id*, Iq* and the two-axis detection current values Id, Iq according to the above-mentioned expression (1).

The two-axis target impression voltage values Vd*, Vq* are input to the impression voltage calculator main-calculation section 226a. In addition, the q-axis target impression voltage value Vq* is input to the feedback controller sub-calculation section 225b mounted in the second microcontroller 23 through the communication line 100.

The impression voltage calculator main-calculation section 226a calculates the three-phase target impression voltage values Vu*, Vv*, Vw* based on dq axes target impression voltage values Vd*, Vq* and the electrical angle θ by performing two-phase/three-phase conversion (dq inversion) by the use of the following expression (2).

$$\begin{bmatrix} V_u^* \\ V_v^* \\ V_w^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \\ -\sin\left(\theta + \frac{1}{6}\pi\right) & \sin\left(\theta - \frac{1}{3}\pi\right) \end{bmatrix} \begin{bmatrix} V_d^* \\ V_q^* \end{bmatrix} \quad (2)$$

The three-phase target impression voltage values Vu*, Vv*, Vw* calculated by expression (2) above are input to the PWM calculation section 224a and the impression voltage calculator sub-calculation section 226b.

The PWM calculation section 224a drives the motor 3 to produce the target output torque (required assist torque) by supplying a PWM signal generated based on the three-phase target impression voltage values Vu*, Vv*, Vw* to the inverter 25a.

Next, reference will be made to the operation of the redundant system of the steering control apparatus according to the first embodiment of the present invention.

First of all, reference will be made to the abnormality determination (validity verification) operations of the target output torque calculator sub-calculation section 221b, the PWM abnormality determination section 224b and the inverter output voltage abnormality determination section 25b in the second microcontroller 23 with respect to the target output torque calculator main-calculation section 221a, the PWM calculation section 224a and the inverter 25a which are arranged outside of the motor output torque control unit 222 in the first microcontroller 22.

In the second microcontroller 23, the target output torque calculator sub-calculation section 221b performs interlocking based on the steering torque Ts detected by the torque sensor 1 and the q-axis target current Iq* input from the first microcontroller 22 through the communication line 100.

The PWM abnormality determination section 224b supervises the carrier wave period of a motor drive signal by directly monitoring the pulse-width modulated three-phase impression voltages Vu, Vv, Vw to the motor 3 through the input interface circuit 21.

Similarly, the inverter output voltage abnormality determination section 25b supervises the neutral point potential of the three-phase impression voltages Vu, Vv, Vw by directly monitoring the three-phase impression voltages Vu, Vv, Vw to the motor 3 through the input interface circuit 21.

The operations of the above-mentioned target output torque calculator sub-calculation section 221b, the PWM abnormality determination section 224b and the inverter output voltage abnormality determination section 25b verify the validity of the apparatus by solely using signals appearing outside of the first and second controllers 22, 23.

That is, the target output torque calculator sub-calculation section 221b verifies the validity of the relation between the input signal (the q-axis target current value to the motor output torque control unit 222 and the steering torque Ts, and the PWM abnormality determination section 224b and the inverter output voltage abnormality determination section 25b verify the validity of the output signals (the phase voltages Vu, Vv, Vw to the motor 3) from the motor output torque control unit 222.

Next, reference will be made to the abnormality determination (validity verification) operation of the calculation sections in the motor output torque control unit 222 while referring to FIG. 2 and FIG. 3 together with FIG. 1.

Figure 2:
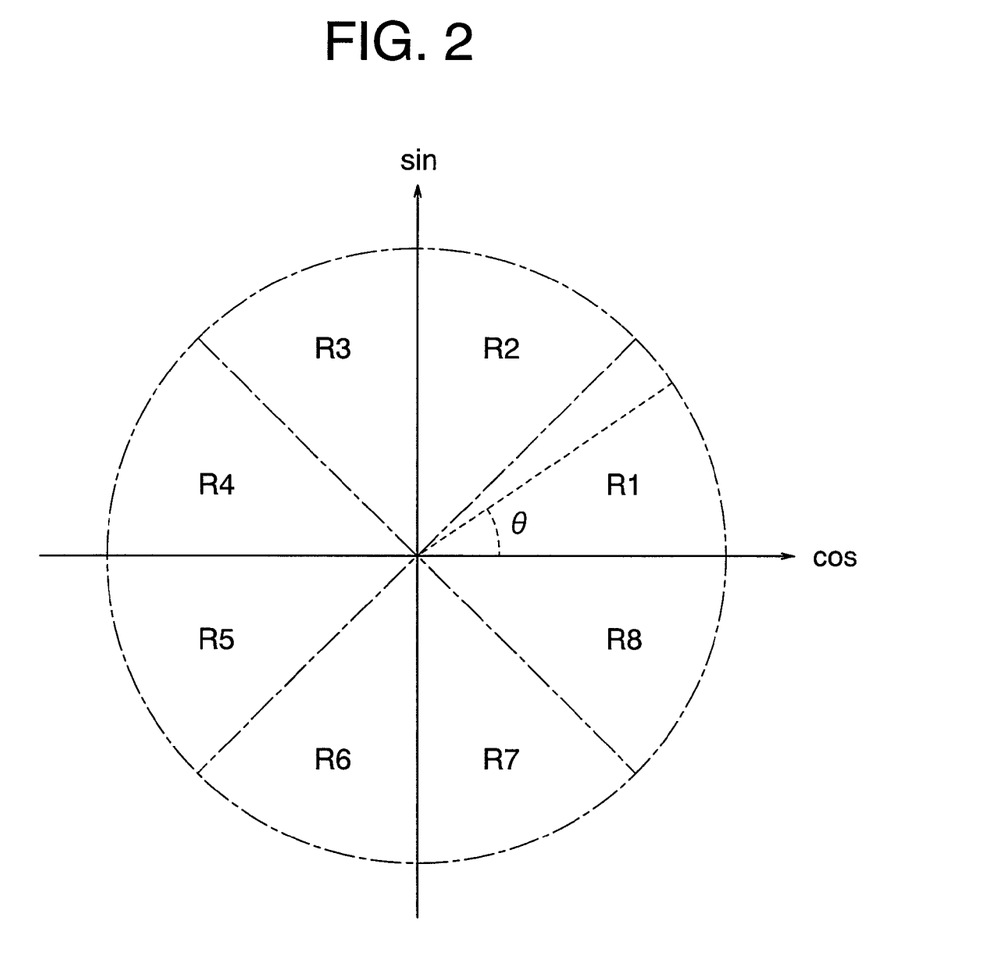
FIG. 2 is an explanatory view showing the operation of a rotor angle calculator sub-calculation section according to the first embodiment of the present invention 1 (first embodiment).
Figure 3:
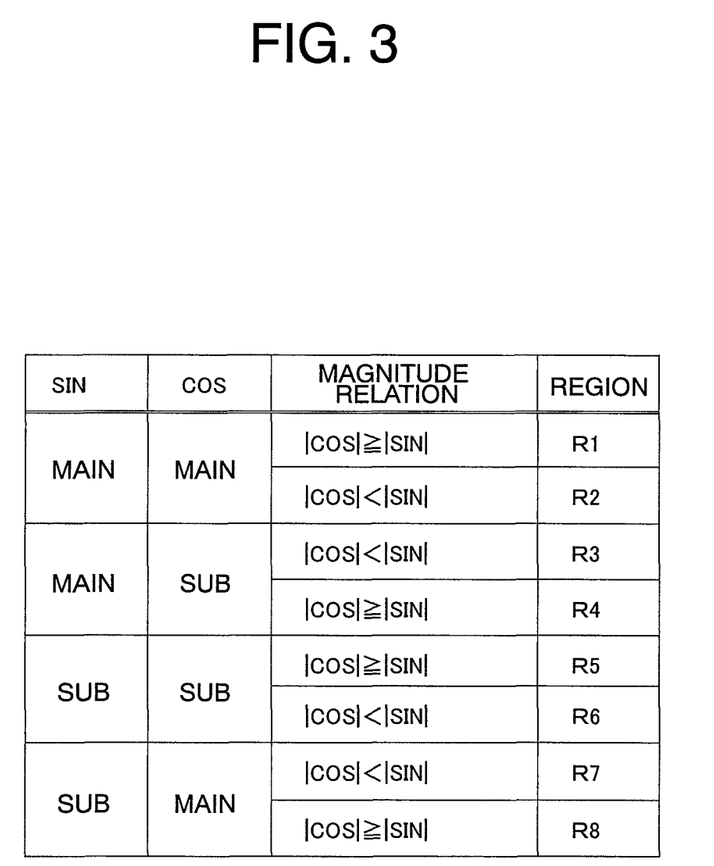
FIG. 3 is an explanatory view showing the operation of the rotor angle calculator sub-calculation section according to the embodiment of the present invention 1 (first embodiment).

FIG. 2 and FIG. 3 are explanatory views that show the operation of the rotor angle calculator sub-calculation section 227b in the second microcontroller 23.

FIG. 2 and FIG. 3 illustrate the rotor angle θ (regions R1 through R8) calculated by the rotor angle calculator sub-calculation section 227b, and the individual regions R1 through R8 in FIG. 2 and FIG. 3 are set by eight sets of combinations of the polarity signs and the amplitude magnitude comparison results of sin θ and cos θ.

In FIG. 1, the feedback controller sub-calculation section 225b, which determines abnormality of the feedback controller main-calculation section 225a in the first microcontroller 22, is mounted in the second microcontroller 23, as previously stated.

The feedback controller sub-calculation section 225b monitors whether the q-axis target impression voltage value Vq* input from the first microcontroller 22 through the communication line 100 is in a predetermined normal range, and determines, when the q-axis target impression voltage value Vq* deviates from the normal range, that the feedback controller main-calculation section 225a is abnormal.

On the other hand, the impression voltage calculator sub-calculation section 226b, which determines abnormality of the impression voltage calculator main-calculation section 226a, is mounted in the first microcontroller 22, and monitors, based on whether the relation of the following expression (3) is satisfied, whether the neutral point potential of the three-phase target impression voltage values Vu*, Vv*, Vw* (the impression voltage calculator main-calculation section 226a).

$$Vu^* + Vv^* + Vw^* = 0 \quad (3)$$

When the above expression (3) is not satisfied, the impression voltage calculator sub-calculation section 226b determines that the impression voltage calculator main-calculation section 226a is abnormal.

On the other hand, the rotor angle calculator sub-calculation section 227b, which determines abnormality of the rotor angle calculator main-calculation section 227a in the first microcontroller 22, is mounted in the second microcontroller 23, as previously stated.

The rotor angle calculator sub-calculation section 227b takes in the information (angular position detection signals sin θ, cos θ) input to the rotor angle calculator main-calculation section 227a from the resolver 4 and the rotor angle θ calculated by the rotor angle calculator main-calculation section 227a from the first microcontroller 22 through the communication line 100, and the rotor angle calculator sub-calculation section 227b determines abnormality of the rotor angle calculator main-calculation section 227a based on the angular position detection signals sin θ, cos θ.

That is, the rotor angle calculator sub-calculation section 227b separately calculates the rotor angle θ' (the regions R1 through R8) with a resolution of 45 degrees from the eight sets of combinations of the polarity signs and the amplitude magnitude comparison results of sin θ and cos θ, as illustrated in FIG. 2 and FIG. 3, compares the rotor angle θ' calculated by itself with the rotor angle θ calculated by the rotor angle calculator main-calculation section 227a, and determines, based on whether the rotor angle θ is in a calculated region, whether the rotor angle calculator main-calculation section 227a is right or wrong.

Finally, the detection current calculator sub-calculation section 228b, which determines abnormality of the detection current calculator main-calculation section 228a, is mounted in the first microcontroller 22, and calculates the d-axis detection current Id and the q-axis detection current Iq based on the actual phase current values Iv, Iw detected by the current detection circuit 24 and the rotor angle (electrical angle) θ calculated by the rotor angle calculator main-calculation section 227a by performing three-phase/two-phase conversion (dq conversion) by the use of the following expression (4).

$$\begin{bmatrix} I_d \\ I_q \end{bmatrix} = \sqrt{2} \begin{bmatrix} \sin(\theta - \frac{\pi}{3}) & -\sin(\theta + \frac{\pi}{3}) \\ \sin(\theta + \frac{\pi}{6}) & -\sin(\theta + \frac{5\pi}{6}) \end{bmatrix} \cdot \begin{bmatrix} I_v \\ I_w \end{bmatrix} \quad (4)$$

The detection current calculator sub-calculation section 228b compares the dq conversion result according to expression (4) above with the dq conversion result of the detection current calculator main-calculation section 228a based on the above-mentioned expression (1), and determines, depending upon whether both of them coincide with each other, whether the detection current calculator main-calculation section 228a is right or wrong.

As described above, it is possible to verify all the main-calculation sections, which are divided into a plurality of sections in the processing unit 2, by performing the calculation processing of the redundant system by the use of the plurality of sub-calculation sections corresponding to the plurality of the main-calculation sections.

Next, reference will be made to the driving control interruption operation of the motor 3 by means of the abnormality determination sections 223a, 223b with a fail safe function.

At least one of the abnormality determination sections 223a, 223b in the first and second microcontrollers 23 determines the presence or absence of abnormality of the main-calculation sections from all the above-mentioned calculation results of the main-calculation sections and the sub-calculation sections, and interrupts the driving of the motor 3 by the inverter 25*a* when it is determined that there is abnormality even in either one of them.

As a result, it is possible to protect the motor 3 and the entire apparatus, as previously stated.

In addition, at least one of the first and second microcontrollers 22, 23 performs an initial check operation upon activation in cooperation with the abnormality determination sections 223*a*, 223*b*.

That is, as stated above, it is examined after activation whether the interruption functions of the abnormality determination sections 223*a*, 223*b* operate normally, and if there is abnormality, the supply of current from the inverter 25*a* to the motor 3 is interrupted so as to prevent the steering control.

Thus, it is possible to protect the motor 3 and the entire apparatus, as previously stated.

As described above, according to the first embodiment of the present invention, it is possible to achieve the redundant system of the motor output torque control unit 222 of a complicated construction for controlling, for example, the three-phase motor of the permanent magnet field on the dq axes with relative ease.

In the above-mentioned first embodiment, the current detection circuit 24 detects the two-phase currents (Iu, Iv), but it may be constructed to detect the three-phase currents (Iu, Iv, Iw).

In this case, there is an advantageous effect that abnormality of the current detection circuit 24 can also be determined in the detection current calculator sub-calculation section 228*b*.

(Embodiment 2)

In the above-mentioned first embodiment, the sub calculations, which are equivalent in contents to the main calculations and relatively large in the calculation amounts, are executed in the first microcontroller 22 including the main CPU having a fast processing speed, and simplified sub calculations are executed in the second microcontroller 23 including the sub CPU having a processing speed slower than that of the main CPU, but it may be constructed such that processing of all the sub calculations are executed in the sub CPU (the second microcontroller 23) by using, as the sub CPU, one that can perform relatively high-speed processing.

In this case, there is an advantageous effect that a satisfactory verification can be made even if completely the same calculation expressions or formulae as those for the main calculations are used as the sub calculations.

For example, in the second microcontroller 23, the rotor angle calculator sub-calculation section 226*b* can obtain the rotor angle θ from the angular position detection signals sin θ and cos θ by performing the same calculations as those for the main calculations without obtaining the rotor angle θ' (see FIG. 2 and FIG. 3) comprising the eight sets of regions R1 through R8, and determine abnormality of the rotor angle calculator main-calculation section 226*a* by comparing it with the calculation result of the main-calculation section.

Similarly, in the first microcontroller 22, the detection current calculator sub-calculation section 228*b* performs the same calculations as those of the corresponding main-calculation section, converts the detected values of at least two phase currents among the individual phase currents of the three-phase motor into two-axis direct currents, and compares them with the calculation results of the corresponding main-calculation section, whereby abnormality of the detection current calculator main-calculation section 228*a* can be determined.

Also, the impression voltage calculator sub-calculation section 226*b* performs the same calculations as those of the corresponding main-calculation section, converts two-axis direct current voltages into respective phase impression voltages to the three-phase motor, and compares them with the calculation results of the corresponding main-calculation section, whereby abnormality of the impression voltage calculator main-calculation section 226*a* can be determined.

Further, although the first and second microcontrollers 22, 23 are used, all the main calculations and sub calculations may be carried out by one and the same microcontroller.

In this case, a satisfactory verification can be performed by setting the main calculations and the sub calculations to different calculation processings having equivalent contents, respectively.

In addition, in case where a single microcontroller is used, a sub CPU (second microcontroller 23) becomes unnecessary, and hence in addition to the above-mentioned advantageous effect, there is an advantageous effect that the redundant system can be achieved with a further simple construction.

(Embodiment 3)

Further, in the above-mentioned first embodiment, for example, the detection current calculator sub-calculation section 228*b* performs the dq conversion by using the above-mentioned expression (4) for a phase current different in phase from the above-mentioned expression (1) in the detection current calculator main-calculation section 228*a*, but it may multiply a current or voltage of the same phase as that in the corresponding main-calculation section by a matrix with its phase shifted therefrom.

In this case, multiplication processing in the sub calculations is added, but the programming construct of the sub calculations can be made completely identical with that of the main calculations, so in addition to the above-mentioned advantageous effects, there is an advantageous effect that the creation of programs can be facilitated.

That is, the detection current calculator sub-calculation section 228*b* obtains a calculation result equivalent to that of a corresponding main-calculation section from at least two phase currents of the individual phase currents of the three-phase motor, and calculates two-axis direct currents by using a matrix different from that in the main-calculation section, whereby it is possible to determine abnormality of the main-calculation section based on a comparison thereof with the calculation result of the main-calculation section.

Similarly, the impression voltage calculator sub-calculation section 226*b* obtains a calculation result equivalent to that of a corresponding main-calculation section from two-axis direct current voltages from a feedback control section, and calculates individual phase impression voltages to the three-phase motor by using a matrix different from that in the main-calculation section, whereby it is possible to determine abnormality of the main-calculation section based on a comparison thereof with the calculation result of the corresponding main-calculation section.

What is claimed is:

1. A steering control apparatus comprising:
  a motor for providing assist torque to a steering system which is operated by a driver;
  a variety of kinds of sensors that detects at least a steering state of said steering system; and
  a processing unit that has an input processing section for taking in sensor detection signals from said variety of kinds of sensors and an output processing section for driving and said motor, and provides an instruction command to said output processing section based on said sensor detection signals;

characterized in that said processing unit includes:

a motor target output torque calculation section that calculates a target output torque of said motor; and a motor output torque control unit that calculates an impression voltage to said motor by controlling a motor current flowing in said motor in a feedback manner so as to make an actual output torque of said motor coincide with said target output torque;

said motor output torque control unit includes at least:

a plurality of main-calculation sections; and a plurality of sub-calculation sections corresponding to said main-calculation sections;

wherein at least a part of said sub-calculation sections determine abnormality of said motor output torque control unit based on a comparison between the calculation results of the at least one part of said sub-calculation sections and the calculation results of main-calculation sections corresponding to the at least one part of said sub-calculation sections, and wherein at least part of said plurality of sub-calculation sections checks main-calculation sections corresponding to said part of sub-calculation sections according to an expression different from that in said corresponding main-calculation sections.

2. The steering control apparatus as set forth in claim 1, characterized in that said motor comprises a polyphase motor;

said plurality of main-calculation sections include an impression voltage calculator main-calculation section for calculating an impression voltage to each phase of said polyphase motor; and said plurality of sub-calculation sections include an impression voltage calculator sub-calculation section for determining abnormality of said impression voltage calculator main-calculation section.

3. The steering control apparatus as set forth in claim 1, characterized in that said motor has an angle sensor for detecting a rotor angle of said motor;

said plurality of main-calculation sections include a rotor angle calculator main-calculation section for calculating said rotor angle; and said plurality of sub-calculation sections include a rotor angle calculator sub-calculation section for determining abnormality of said rotor angle calculator main-calculation section.

4. The steering control apparatus as set forth in claim 3, characterized in that said angle sensor outputs an angular position detection signal including information on $\sin \theta$ and $\cos \theta$ for a rotor angle $\theta$ of said motor;

said rotor angle calculator main-calculation section obtains said rotor angle $\theta$ from arctan;

said rotor angle calculator sub-calculation section obtains a separate rotor angle $\theta'$ with a resolution of 45 degrees from eight sets of combinations related to polarity signs and an amplitude magnitude comparison relation of said angular position detection signals $\sin \theta$ and $\cos \theta$; and abnormality of said rotor angle calculator main-calculation section is determined based on a comparison between said rotor angle $\theta$ and said separate rotor angle $\theta'$.

5. The steering control apparatus as set forth in claim 3, characterized in that said angle sensor outputs an angular position detection signal including information on $\sin \theta$ and $\cos \theta$ for said rotor angle $\theta$;

said rotor angle calculator main-calculation section obtains said rotor angle $\theta$ from arctan;

said rotor angle calculator sub-calculation section obtains a separate rotor angle $\theta'$ by performing the same calculation as that in said rotor angle calculator main-calculation section; and abnormality of said rotor angle calculator main-calculation section is determined based on a comparison between said rotor angle $\theta$ and said separate rotor angle $\theta'$.

6. The steering control apparatus as set forth in claim 1, characterized in that said motor comprises a three-phase motor;

said plurality of main-calculation sections include a detection current calculator main-calculation section for converting at least two phase current detection values among individual phase currents of said three-phase motor into two-axis direct currents; and said plurality of sub-calculation sections include a detection current calculator sub-calculation section for determining abnormality of said detection current calculator main-calculation section.

7. The steering control apparatus as set forth in claim 6, characterized in that said detection current calculator sub-calculation section converts at least two phase current detection values among individual phase currents of the three-phase motor into two-axis direct currents; and at least one phase among the current detection values used by said detection current calculator sub-calculation section is a current detection value of a phase that is not used by said detection current calculator main-calculation section.

8. The steering control apparatus as set forth in claim 6, characterized in that said detection current calculator sub-calculation section obtains a conversion result equivalent to that of said detection current calculator main-calculation section from at least two phase current detection values among individual phase currents of the three-phase motor, and converts it into said two-axis direct currents by using a matrix different from that used by said detection current calculator main-calculation section.

9. The steering control apparatus as set forth in claim 6, characterized in that said detection current calculator sub-calculation section performs the same calculations as those in said detection current calculator main-calculation section.

10. The steering control apparatus as set forth in claim 1, characterized in that said motor comprises a three-phase motor;

said motor output torque control unit includes a feedback control section that performs feedback control by converting two-axis direct currents converted from individual phase currents of said three-phase motor into two-axis direct current voltages;

said plurality of main-calculation sections include an impression voltage calculator main-calculation section that converts said two-axis direct current voltages into impression voltages to the individual phases of said three-phase motor; and said plurality of sub-calculation sections include an impression voltage calculator sub-calculation section for determining abnormality of said impression voltage calculator main-calculation section.

11. The steering control apparatus as set forth in claim 10, characterized in that said impression voltage calculation section sub-calculation section calculates a neutral point potential of the impression voltages to said three-phase motor;

said impression voltage calculation section sub-calculation section determines abnormality of said impression voltage calculator main-calculation section based on a comparison between a neutral point potential of the impression voltages to said three-phase motor from said impression voltage calculator main-calculation section and the neutral point potential of the impression voltages to said three-phase motor calculated by said impression voltage calculation section sub-calculation section.

12. The steering control apparatus as set forth in claim 10, characterized in that said impression voltage calculation section sub-calculation section obtains a conversion result equivalent to that of said impression voltage calculator main-calculation section from two phase current detection values from the feedback control section, and converts it into impression voltages to said three-phase motor by using a matrix different from that used by said impression voltage calculator main-calculation section; and said impression voltage calculation section sub-calculation section determines abnormality of said impression voltage calculator main-calculation section based on a comparison between the impression voltages to said three-phase motor from said impression voltage calculator main-calculation section and the impression voltages to said three-phase motor converted by said impression voltage calculation section sub-calculation section.

13. The steering control apparatus as set forth in claim 10, characterized in that said impression voltage calculation section sub-calculation section calculates impression voltages to said three-phase motor by performing the same calculation as that in said impression voltage calculator main-calculation section;

said impression voltage calculation section sub-calculation section determines abnormality of said impression voltage calculator main-calculation section based on a comparison between the impression voltages to said three-phase motor from said impression voltage calculator main-calculation section and the impression voltages to said three-phase motor calculated by said impression voltage calculation section sub-calculation section.

14. The steering control apparatus as set forth in claim 1, characterized in that said motor comprises a three-phase motor;

said plurality of main-calculation sections include a current feedback controller main-calculation section that controls two-axis direct currents converted from individual phase currents of said three-phase motor in a feedback manner; and said plurality of sub-calculation sections include a current feedback controller sub-calculation section for determining abnormality of said current feedback controller main-calculation section.

15. The steering control apparatus as set forth in claim 1, characterized in that said plurality of sub-calculation sections check said plurality of main-calculation sections corresponding to said plurality of sub-calculation sections by means of the same calculations as those in said plurality of main-calculation sections corresponding to said plurality of sub-calculation sections.

16. The steering control apparatus as set forth in claim 1, characterized in that said plurality of main-calculation sections and said plurality of sub-calculation sections are incorporated in one and the same microcontroller.

17. The steering control apparatus as set forth in claim 1, characterized in that said plurality of main-calculation sections are incorporated in a first microcontroller; and said plurality of sub-calculation sections are incorporated in a second microcontroller which is different from said first microcontroller.

18. The steering control apparatus as set forth in claim 17, characterized in that said first and second microcontrollers are connected to each other through a communication line; and predetermined data which contributes to abnormality determination of said plurality of main-calculation sections is input to said plurality of sub-calculation sections through said communication line.

19. The steering control apparatus as set forth in claim 1, characterized by comprising:

an energization and deenergization control section that controls the supply of current to said motor and interruption thereof;

wherein said energization and deenergization control section interrupts the supply of current to said motor when it is determined by said plurality of sub-calculation sections that at least one of said plurality of main-calculation sections is abnormal.

20. The steering control apparatus as set forth in claim 19, characterized by comprising:

an energization and deenergization function check section that checks an energization and deenergization function of said energization and deenergization control section;

wherein said energization and deenergization function check section checks at least once the function of energizing and deenergizing said motor according to said energization and deenergization control section before the driving control of said motor after activation of said steering control apparatus is started; and said energization and deenergization function check section inhibits the driving control of said motor when it is determined that said energization and deenergization function is abnormal.

* * * * *